United States Patent
You

(10) Patent No.: US 8,810,929 B2
(45) Date of Patent: Aug. 19, 2014

(54) IMAGING LENS UNIT

(71) Applicant: Samsung Electro-Mechanics Co., Ltd., Suwon (KR)

(72) Inventor: Ho Sik You, Seongnam-si (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 0 days.

(21) Appl. No.: 14/106,578

(22) Filed: Dec. 13, 2013

(65) Prior Publication Data

US 2014/0104709 A1 Apr. 17, 2014

Related U.S. Application Data

(63) Continuation of application No. 13/434,980, filed on Mar. 30, 2012.

(30) Foreign Application Priority Data

Oct. 10, 2011 (KR) ........................ 10-2011-0103101

(51) Int. Cl.
  *G02B 9/60* (2006.01)
  *G02B 13/00* (2006.01)

(52) U.S. Cl.
  CPC ........ *G02B 13/0015* (2013.01); *G02B 13/0045* (2013.01); *G02B 9/60* (2013.01)
  USPC .......................................... 359/764; 359/763

(58) Field of Classification Search
  USPC ................................................ 359/763, 764
  See application file for complete search history.

(56) References Cited

U.S. PATENT DOCUMENTS

| 7,502,181 | B2 | 3/2009 | Shinohara | |
|---|---|---|---|---|
| 8,411,374 | B2 | 4/2013 | Ohtsu | |
| 2010/0253829 | A1 | 10/2010 | Shinohara | |
| 2013/0208174 | A1* | 8/2013 | Tamura | 348/344 |
| 2013/0335622 | A1 | 12/2013 | Kwon | |

FOREIGN PATENT DOCUMENTS

| JP | 2007-298572 | | 11/2007 |
|---|---|---|---|
| JP | 2010-256608 | A | 11/2010 |
| KR | 10-2010-0043667 | | 4/2010 |
| KR | 10-2011-0071554 | | 6/2011 |
| WO | 2010-024198 | | 3/2010 |

OTHER PUBLICATIONS

Office Action issued for related Korean Patent Application No. 10-2011-0103101, dated Jan. 21, 2013, and its English summary provided by the clients.
Final Office Action dated Sep. 3, 2013 for related U.S. Appl. No. 13/434,980.

(Continued)

*Primary Examiner* — Jack Dinh
(74) *Attorney, Agent, or Firm* — Ladas & Parry, LLP

(57) ABSTRACT

Disclosed herein is an imaging lens unit, including: a first lens having a positive (+) power; a second lens having a negative (−) power; a third lens selectively having one of a positive (+) and negative (−) power; a fourth lens having a negative (−) power; and a fifth lens having a negative (−) power, wherein the first lens, the second lens, the third lens, the fourth lens, and fifth lens are arranged in order from an object to be formed as an image, and the fourth lens is concave toward an image side.

30 Claims, 12 Drawing Sheets

(56) References Cited

OTHER PUBLICATIONS

Office Action dated Feb. 8, 2013 for related U.S. Appl. No. 13/434,980.

Office Action dated Jan. 29, 2014 for related U.S. Appl. No. 13/434,980.

Final Office Action dated Mar. 25, 2014 for U.S. Appl. No. 13/434,980.

* cited by examiner

IMAGING LENS UNIT

CROSS REFERENCE TO RELATED APPLICATION

This application is a continuation application of U.S. patent application Ser. No. 13/434,980 of Mar. 30, 2012, which claims the benefit of Korean Patent Application No. 10-2011-0103101, filed on Oct. 10, 2011, entitled "Image Lense Unit", which are hereby incorporated by reference in their entireties into this application.

CROSS REFERENCE TO RELATED APPLICATION

This application claims the benefit of Korean Patent Application No. 10-2011-0103101, filed on Oct. 10, 2011, entitled "Image Lense Unit", which is hereby incorporated by reference in its entirety into this application.

BACKGROUND OF THE INVENTION

1. Technical Field

The present invention relates to an imaging lens unit.

2. Description of the Related Art

Recently, due to the advancement in technology, mobile terminals such as mobile phones and personal digital assistants (PDAs) are currently used for not only making simple phone calls but to also perform functions for multi-convergence such as playing music or movies, watching TV, and playing games. One of the leading factors for such multi-convergence is a camera module.

In general, a compact camera module (CCM) has a compact size and is applied to portable mobile communication devices such as camera phones, PDAs, and smartphones and various information technology (IT) devices such as toy cameras. Presently, CCMs are being installed in various devices in order to meet demands of consumers having specific preferences As the CCMs have to perform various functions using a compact optical system, various techniques are used to make the modules slim. In addition to the slim size, demands for image quality of the compact optical system are also increasing, and thus development of slim optical system providing a high image quality is required.

Thus, recently, an imaging lens unit constituting a high resolution imaging lens by using five lenses having positive (+) refractive power and negative (−) refractive power has been developed.

However, the imaging lens unit having five lenses described above cannot provide normal optical characteristics or aberration characteristics as desired by users according to predetermined conditions.

SUMMARY OF THE INVENTION

The present invention has been made in an effort to provide an imaging lens unit having five lenses and satisfying conditions of optical characteristics desired by users and showing excellent aberration characteristics.

According to a first preferred embodiment of the present invention, there is provided an imaging lens unit, including: a first lens having a positive (+) power; a second lens having a negative (−) power; a third lens selectively having one of a positive (+) and negative (−) power; a fourth lens having a negative (−) power; and a fifth lens having a negative (−) power, wherein the first lens, the second lens, the third lens, the fourth lens, and fifth lens are arranged in order from an object to be formed as an image, and the fourth lens is concave toward an image side.

The fourth lens may be a meniscus-shaped lens.

An Abbe number v4 of the fourth lens may satisfy the following conditional expression:

$$0<v4<30.$$

The second lens and the fourth lens may be formed of a high dispersion material.

An Abbe number v1 of the first lens may satisfy the following conditional expression:

$$50<v1.$$

An Abbe number v2 of the second lens may satisfy the following conditional expression:

$$0<v2<30.$$

The first lens may have a convex form toward an object side.

The second lens may have a concave form toward the image side.

The fifth lens may have an inflection point toward the image side.

The third lens may have negative (−) power.

The third lens may have positive (+) power.

The imaging lens unit may further include an aperture stop disposed in front of the first lens to adjust a light amount.

The imaging lens unit may further include an aperture stop disposed between the first lens and the second lens to adjust a light amount.

The first lens, the second lens, the third lens, and the fourth lens may all be made of a plastic material.

A total focal length f of the imaging lens unit, a curvature radius r7 of the fourth lens on the object side, and a curvature radius r8 of the fourth lens on the image side may satisfy the following conditional expression:

$$0<(r7+r8)/(r7-r8)<-2.5.$$

A total focal length f of the imaging lens unit and a distance tt from a vertex of the first lens on the object side to the image side may satisfy the following conditional expression:

$$0<tt/f<1.3.$$

An Abbe number v1 of the first lens, an Abbe number v2 of the second lens, an Abbe number v3 of the third lens, and an Abbe number v4 of the fourth lens may satisfy the following conditional expression:

$$0.7<(v1+v2)/(v3+v4)<1.0.$$

DESCRIPTION OF THE PREFERRED EMBODIMENTS

Figure 1:
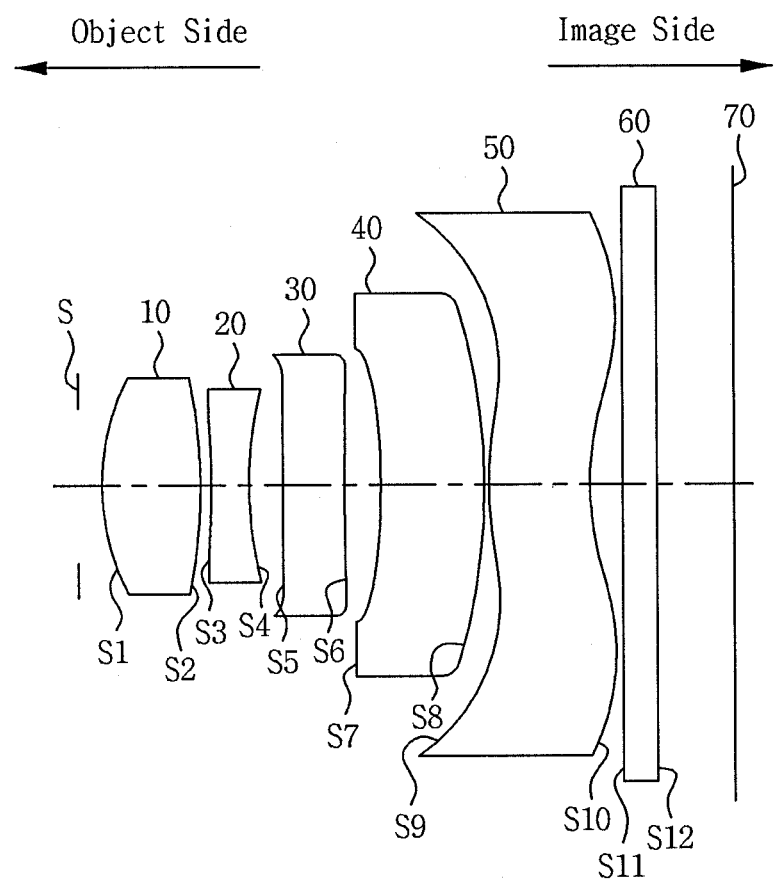
FIG. 1 is a cross-sectional view schematically illustrating an internal structure of an imaging lens unit according to a first embodiment of the present invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

Hereinafter, preferred embodiments of the present invention will be described in detail with reference to the accompanying drawings.

First Embodiment

FIG. 1 is a cross-sectional view schematically illustrating an internal structure of an imaging lens unit according to a first embodiment of the present invention. As illustrated in FIG. 1, the imaging lens unit according to the first embodiment of the present invention includes, in order from an object side of an object, which is to be formed as an image, a first lens 10, a second lens 20, a third lens 30, a fourth lens 40, a fifth lens 50, a filter 60, and an image sensor 70.

Also, an aperture stop S that adjusts a light amount of incident light that is incident from the object to be formed as an image and a focal depth may be disposed toward the object side to be separated a predetermined distance from the first lens 10.

Accordingly, the light amount of the object to be imaged passes through each of the first lens 10, the second lens 20, the third lens 30, the fourth lens 40, and the fifth lens 50 to be incident on the image sensor 70.

Also, the filter 60 may be formed of an ultraviolet ray blocking filter (IR cut filter), that prevents ultraviolet rays emitted from the incident light that is incident therethrough from being transmitted to the image sensor 70 disposed on an image side.

In detail, the first lens 10 has positive (+) power, and the second lens 20 has negative (−) power, the third lens 30 has negative (−) power, the fourth lens 40 has negative (−) power, and the fifth lens 50 has negative (−) power.

Also, the first lens 10 is convex toward the object side, and an Abbe number v1 of the first lens 10 satisfies the following conditional expression:

$50 < v1.$  Conditional expression (1):

Also, the second lens 20 is concave toward the image side, and an Abbe number v2 of the second lens 20 satisfies the following conditional expression:

$0 < v2 < 30.$  Conditional expression (2):

Also, the fourth lens 40 is concave toward the image side and has a meniscus shape, and an Abbe number v4 of the fourth lens 40 satisfies the following conditional expression:

$0 < v4 < 30.$  Conditional expression (3):

Also, the fifth lens 50 has an inflection point toward the image side.

In addition, the second lens 20 and the fourth lens 40 are made of a high dispersion material.

The imaging lens unit according to the first embodiment of the present invention illustrated in FIG. 1 satisfies the above-described conditional expressions (1), (2), and (3), and also satisfies the following conditional expressions, thus providing excellent aberration characteristics and high resolving power.

$0 < (r7+r8)/(r7-r8) < -2.5$  Conditional expression (4):

$0 < tt/f < 1.3$  Conditional expression (5):

$0.7 < (v1+v2)/(v3+v4) < 1.0$  Conditional expression (6):

Here, the symbols denote the following:
f: total focal length of the imaging lens unit
r7: curvature radius of the fourth lens 40 at the object side
r8: curvature radius of the fourth lens 40 at the image side
tt: distance between a vertex of the first lens 10 at the object side and the image side
v1: Abbe number of the first lens 10
v2: Abbe number of the second lens 20
v3: Abbe number of the third lens 30
v4: Abbe number of the fourth lens 40

Also, aspheric constants of the imaging lens unit according to the first embodiment of the present invention may be obtained using Equation 1 below.

$$Z(h) = \frac{ch^2}{1 + \sqrt{1 - (1+k)c^2 h^2}} + Ah^4 + Bh^6 + Ch^8 + Dh^{10} + Eh^{12} + Fh^{14} \qquad [\text{Equation 1}]$$

Z: distance from a vertex of a lens to an optical axis direction
c: basic curvature of a lens
h: distance from a vertex of a lens to a direction perpendicular to the optical axis
K: Conic constant
A, B, C, D, E, F: aspheric constants
Here, the alphabet E used with a conic constant K or with an aspheric constant A, B, C, D, E, or F and a number connected to the alphabet E by a hyphen "-" denote the involution of 10.

For example, "E+01" denotes $10^1$, and "E-01" denotes $10^{-1}$.

Table 1 below shows design data of the lenses of the imaging lens unit according to the first embodiment of the present invention.

TABLE 1

| Lens number | Lens surface number | Curvature radius (mm) | Thickness (mm) | Index | Abbe number |
|---|---|---|---|---|---|
| First lens | S1 | 1.763 | 0.900 | 1.534 | 56.200 |
|  | S2 | −5.672 | 0.063 |  |  |
| Second lens | S3 | −9.198 | 0.364 | 1.614 | 25.600 |
|  | S4 | 4.163 | 0.308 |  |  |
| Third lens | S5 | 14.875 | 0.551 | 1.534 | 56.200 |
|  | S6 | 11.495 | 0.305 |  |  |
| Fourth lens | S7 | −4.748 | 0.900 | 1.614 | 25.600 |
|  | S8 | −5.587 | 0.058 |  |  |
| Fifth lens | S9 | 2.809 | 0.900 | 1.534 | 56.200 |
|  | S10 | 1.784 | 0.300 |  |  |
| Filter | S11 | 000 | 0.300 | 1.517 | 64.197 |
|  | S12 | 000 | 0.700 |  |  |

As shown in Table 1, an Abbe number v1 of the first lens 10 according to the first embodiment of the present invention is 56.200, thus satisfying Conditional expression (1).

Also, an Abbe number v2 of the second lens 20 is 25.600, thus satisfying Conditional expression (2).

Also, an Abbe number v4 of the fourth lens 40 is 25.600, thus satisfying Conditional expression (3).

In addition, it can be seen from a curvature radius of the fourth lens 40 that Conditional expression (4) is satisfied.

In addition, it can be seen from Abbe numbers of the first lens 10, the second lens 20, and the fourth lens 40 that Conditional expression (6) is satisfied.

Table 2 below shows aspheric constants of the lenses of the imaging lens unit according to the first embodiment of the present invention.

TABLE 2

| Lens number | Lens surface number | K | A | B | C | D | E | F |
|---|---|---|---|---|---|---|---|---|
| First lens | S1 | −1.0691E+00 | 1.2819E−02 | −1.2774E−02 | 7.1902E−03 | −1.9070E−02 |  |  |
|  | S2 | −3.6984E+01 | −7.3735E−03 | −7.9849E−02 | 2.3367E−02 | 2.6266E−03 |  |  |
| Second lens | S3 | 0.0000E+00 | 7.4005E−02 | −7.3221E−02 | 1.9838E−02 | 2.5006E−02 |  |  |
|  | S4 | 1.4763E+01 | 2.4962E−02 | 1.1805E−02 | −1.7987E−02 | 1.0340E−02 |  |  |
| Third lens | S5 | 0.0000E+00 | −6.9792E−02 | −7.6877E−03 | 3.2156E−02 | −3.1754E−02 |  |  |
|  | S6 | 0.0000E+00 | 6.8123E−03 | −8.2799E−02 | 5.8992E−02 | −2.0776E−02 |  |  |
| Fourth lens | S7 | −1.0154E+02 | −1.1014E−03 | −1.7923E−02 | −6.7548E−02 | 5.6115E−02 | −1.8166E−02 |  |
|  | S8 | −7.9624E+00 | 3.4197E−02 | −3.3333E−02 | 7.9714E−02 | −6.9532E−03 | 1.0098E−05 |  |
| Fifth lens | S9 | −1.0389E+01 | −9.0596E−02 | 2.2209E−02 | −3.7819E−03 | 5.0937E−04 | −4.6163E−05 |  |
|  | S10 | −6.3248E+00 | −4.9536E−02 | 1.1043E−02 | −1.9780E−03 | 1.9725E−04 | −9.8808E−06 |  |

Below, Table 3 shows focal lengths (Focal Length Tolerance, EFL) of the lenses of the imaging lens unit according to the first embodiment of the present invention, and according to the above conditional expressions.

TABLE 3

| Lens number | Focal length |
|---|---|
| First lens | 2.629 |
| Second lens | −4.619 |
| Third lens | −100.407 |
| Fourth lens | −87.132 |

TABLE 3-continued

| Lens number | Focal length |
|---|---|
| Fifth lens | −13.178 |
| Ass'y | 4.9455 |

As shown in Table 3, it can be seen from the focal length of the first lens 10 according to the first embodiment of the present invention that Conditional expression (5) is satisfied.

Figure 2:
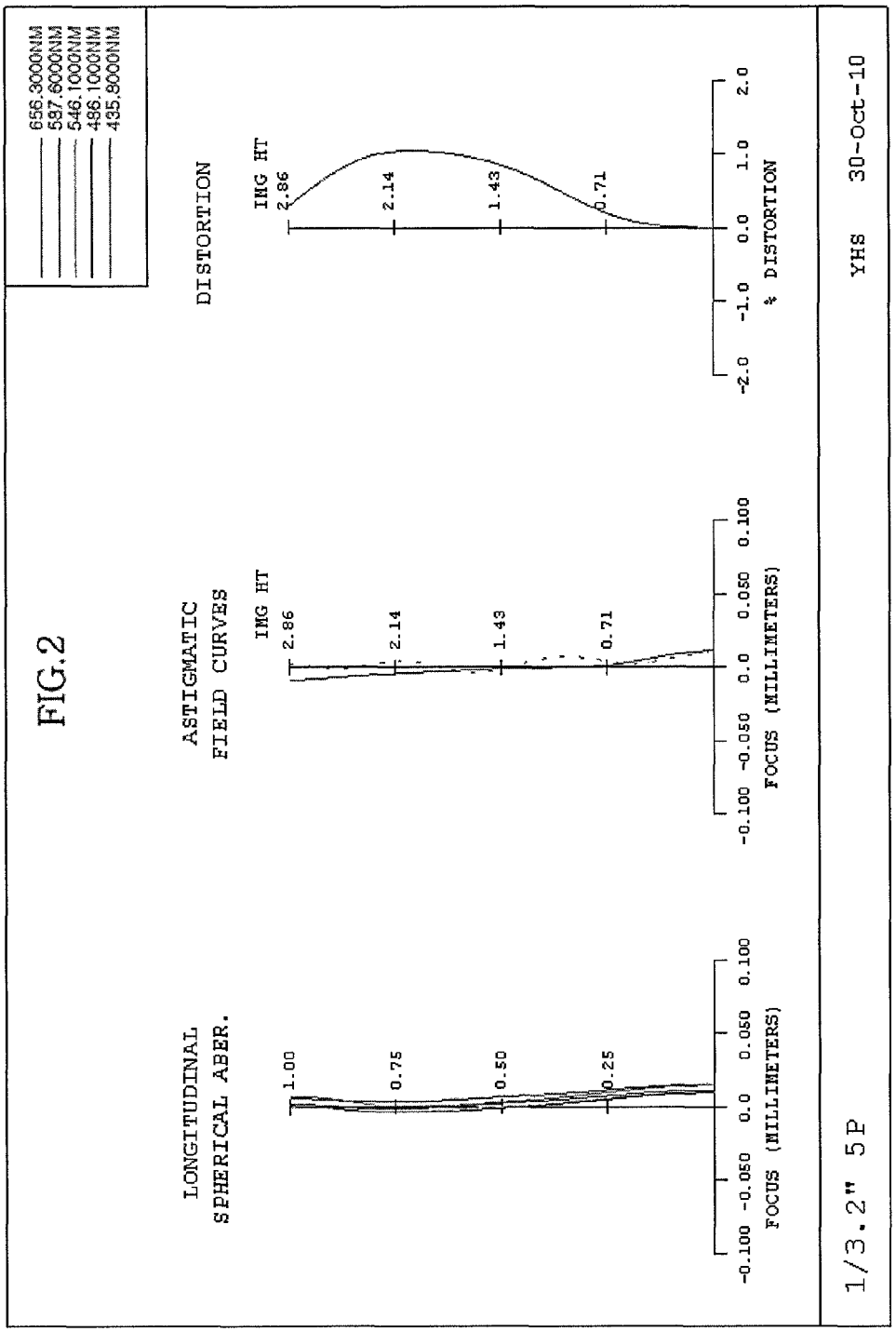
FIG. 2 is a graph showing aberrations of the imaging lens unit according to the first embodiment of the present invention.

FIG. 2 is a graph showing aberrations of the imaging lens unit according to the first embodiment of the present invention. As illustrated in FIG. 2, the graph shows longitudinal spherical aberration, astigmatic field curves, and distortion.

A Y-axis of the graph of FIG. 2 denotes an image height, and an X-axis denotes a focal length (unit: mm) and distortion (unit: %).

Also, with regard to interpretation of the graph of FIG. 2, it may be interpreted that the closer the curves of the graph are to the Y-axis, the better is an aberration correction function. Referring to the graph of FIG. 2, experimental data values measured according to the first embodiment of the present invention are close to the Y-axis in almost all areas.

Accordingly, the imaging lens unit according to the first embodiment of the present invention has excellent characteristics regarding spherical aberration, astigmatism, and distortion.

Figure 3:
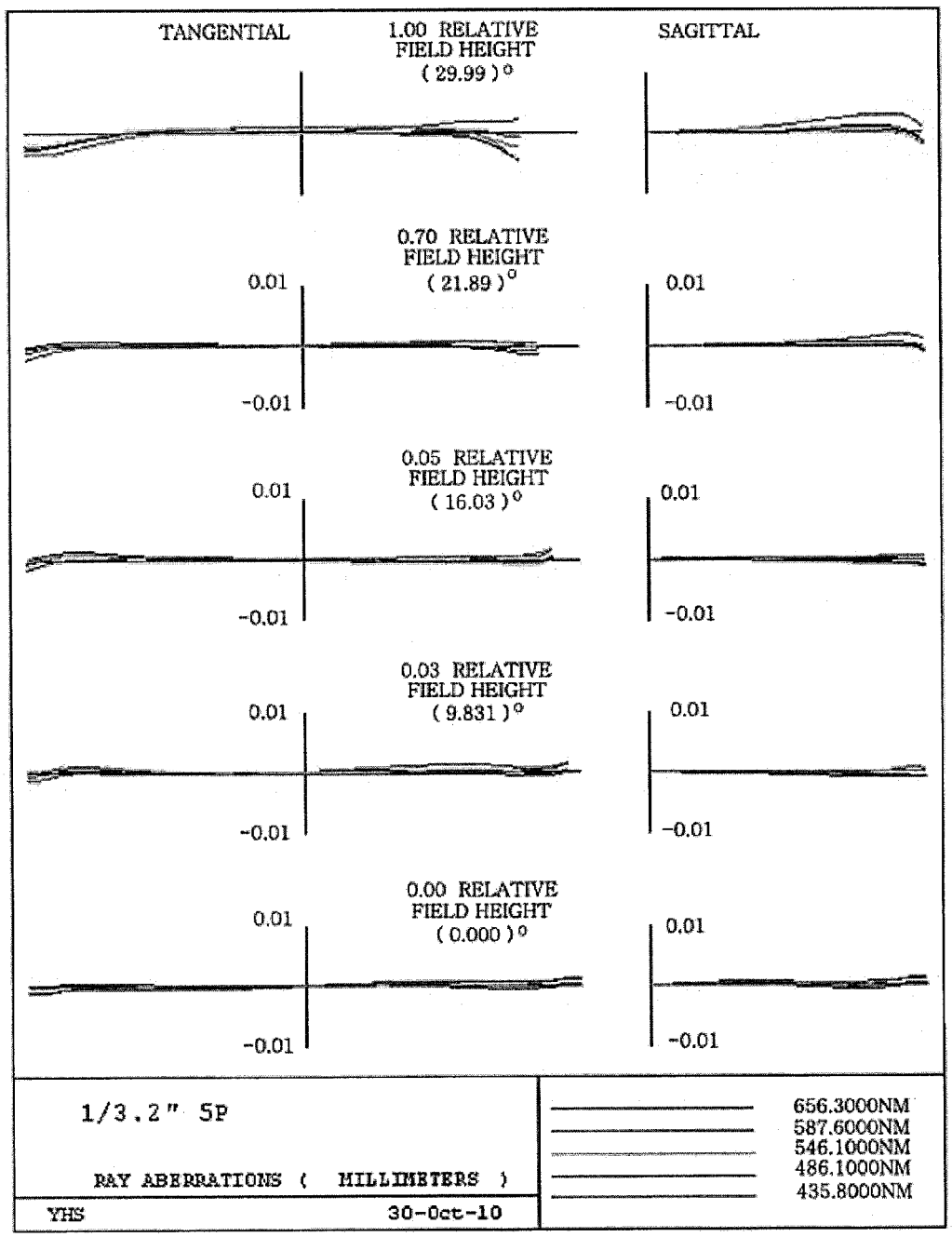
FIG. 3 is a graph showing coma aberration of the imaging lens unit according to the first embodiment of the present invention.

FIG. 3 is a graph showing coma aberration of the imaging lens unit according to the first embodiment of the present invention. As illustrated in FIG. 3, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 3, experimental data values measured according to the first embodiment of the present invention are close to the X-axis in almost all areas.

Thus, the imaging lens unit according to the first embodiment of the present invention provides an excellent coma aberration correction function.

Second Embodiment

Figure 4:
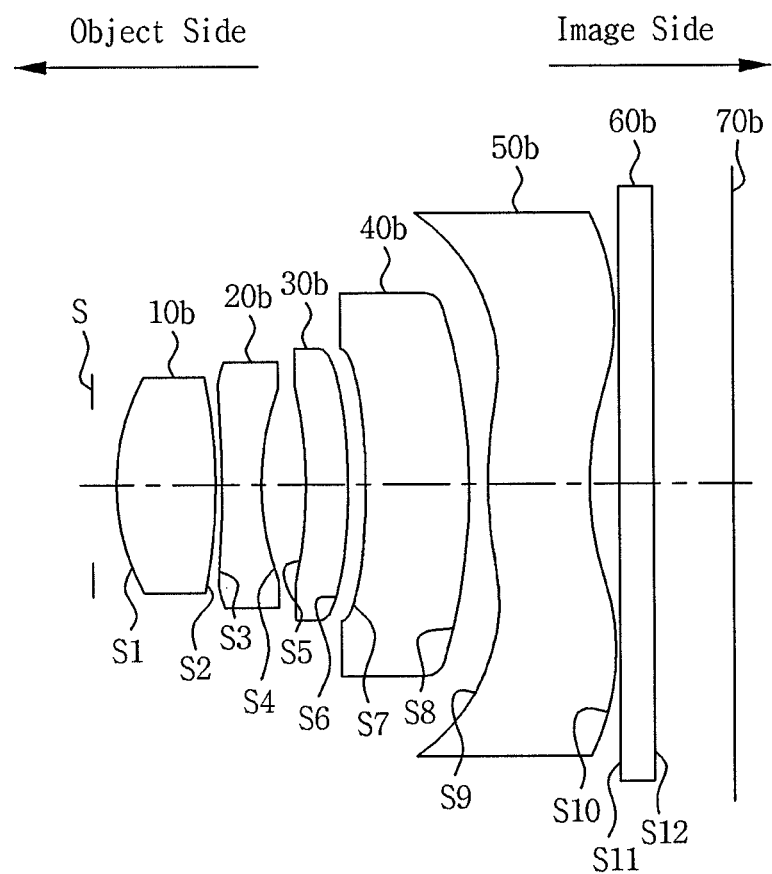
FIG. 4 is a cross-sectional view schematically illustrating an internal structure of an imaging lens unit according to a second embodiment of the present invention.

FIG. 4 is a cross-sectional view schematically illustrating an internal structure of an imaging lens unit according to a second embodiment of the present invention. Description of the same or corresponding elements to those of the previous embodiment will be denoted with the same reference numerals, and description of repeated elements will be omitted. In regard to this, the imaging lens unit according to the second embodiment of the present invention will be described hereinafter.

As illustrated in FIG. 4, the imaging lens unit according to the second embodiment of the present invention includes, in order from an object side of an object which is to be formed as an image, a first lens 10b, a second lens 20b, a third lens 30b, a fourth lens 40b, a fifth lens 50b, a filter 60, and an image sensor 70.

In detail, the first lens 10b has positive (+) power, and the second lens 20b has negative (−) power, third lens 30b has positive (+) power, the fourth lens 40b has negative (−) power, and the fifth lens 50b has negative (−) power.

Also, the filter 60 and the image sensor 70 are arranged at the back of the fifth lens 50b.

Also, an aperture stop S that adjusts a light amount of incident light incident from an object to be formed as an image and a focal depth may be disposed toward the object side to be separated at a predetermined distance from the first lens 10b.

Table 4 below shows design data of the lenses of the imaging lens unit according to the second embodiment of the present invention.

TABLE 4

| Lens number | Lens surface number | Curvature radius (mm) | Thickness (mm) | Index | Abbe number |
|---|---|---|---|---|---|
| First lens | S1 | 1.816 | 0.900 | 1.534 | 56.200 |
| | S2 | −5.547 | 0.054 | | |
| Second lens | S3 | −97.166 | 0.400 | 1.614 | 25.600 |
| | S4 | 2.856 | 0.361 | | |
| Third lens | S5 | −8.294 | 0.525 | 1.534 | 56.200 |
| | S6 | −4.105 | 0.272 | | |
| Fourth lens | S7 | −2.584 | 0.900 | 1.614 | 25.600 |
| | S8 | −3.098 | 0.150 | | |
| Fifth lens | S9 | 3.311 | 0.900 | 1.534 | 56.200 |
| | S10 | 1.662 | 0.300 | | |
| Filter | S11 | | 0.300 | 1.517 | 64.197 |
| | S12 | | 0.700 | | |

Table 5 below shows aspheric constants of the lenses of the imaging lens unit according to the second embodiment of the present invention.

TABLE 5

| Lens number | Lens surface number | K | A | B | C | D | E | F |
|---|---|---|---|---|---|---|---|---|
| First lens | S1 | −1.0273E+00 | 1.3839E−02 | −9.1788E−03 | 8.0117E−03 | −1.4801E−02 | | |
| | S2 | −2.9977E+01 | 1.6039E−02 | −7.8975E−02 | 1.8846E−02 | 2.9650E−04 | | |
| Second lens | S3 | 0.0000E+00 | 4.0689E−02 | −5.3059E−02 | 1.1937E−03 | 2.1356E−02 | | |
| | S4 | 5.3062E+00 | −1.8141E−02 | 2.2376E−02 | 2.7022E−02 | 1.1053E−02 | | |
| Third lens | S5 | 0.0000E+00 | −3.5015E−02 | −2.0312E−02 | 3.5575E−02 | −2.2585E−02 | | |
| | S6 | 0.0000E+00 | 5.6233E−02 | −1.2617E−01 | 7.4023E−02 | −2.0183E−02 | | |
| Fourth lens | S7 | −2.3140E+01 | 1.0244E−02 | −4.6689E−02 | 3.7693E−02 | 3.8980E−02 | 1.3645E−02 | |
| | S8 | −1.6824E+01 | 1.8939E−02 | −2.9754E−02 | 7.9458E−03 | −8.5824E−04 | 4.4694E−05 | |
| Fifth lens | S9 | −1.2507E+00 | −1.0725E−01 | 2.3608E−02 | 3.6392E−03 | 4.5632E−04 | 2.9218E−05 | |
| | S10 | −6.5984E+00 | −3.9477E−02 | 7.0115E−03 | 1.0061E−03 | 6.4242E−05 | 1.6654E−06 | |

Below, Table 6 shows focal lengths (Focal Length Tolerance, EFL) of the lenses of the imaging lens unit according to the second embodiment of the present invention and according to the above conditional expressions.

TABLE 6

| Lens number | Focal length |
|---|---|
| First lens | 2.629 |
| Second lens | −4.619 |
| Third lens | 14.584 |
| Fourth lens | −75.715 |
| Fifth lens | −7.714 |
| Ass'y | 4.9479 |

Figure 5:
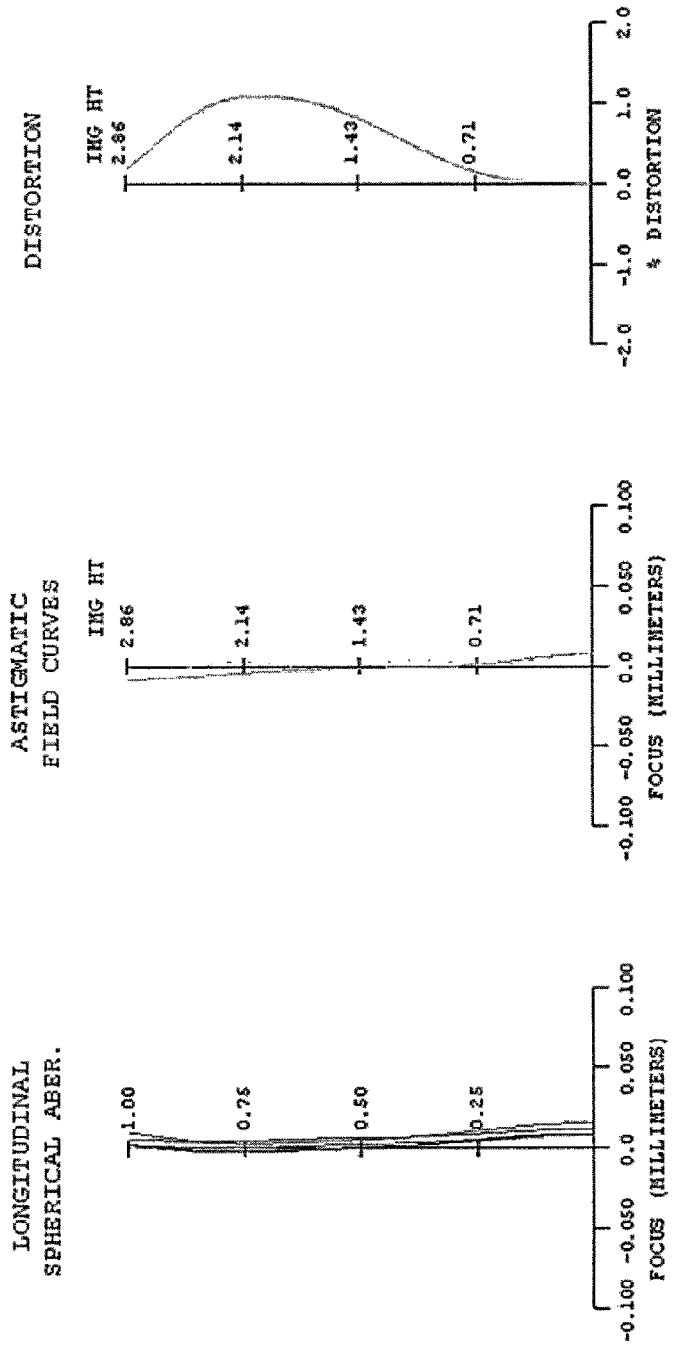
FIG. 5 is a graph showing aberrations of the imaging lens unit according to the second embodiment of the present invention.

FIG. 5 is a graph showing aberrations of the imaging lens unit according to the second embodiment of the present invention. As illustrated in FIG. 5, the graph shows longitudinal spherical aberration, astigmatic field curves, and distortion.

A Y-axis of the graph of FIG. 5 denotes an image height, and an X-axis denotes a focal length (unit: mm) and distortion (unit: %).

Also, with regard to interpretation of the graph of FIG. 5, it may be interpreted that the closer the curves of the graph are to the Y-axis, the better is an aberration correction function. Referring to the graph of FIG. 5, experimental data values measured according to the second embodiment of the present invention are close to the Y-axis in almost all areas.

Accordingly, the imaging lens unit according to the second embodiment of the present invention has excellent characteristics regarding spherical aberration, astigmatism, and distortion.

Figure 6:
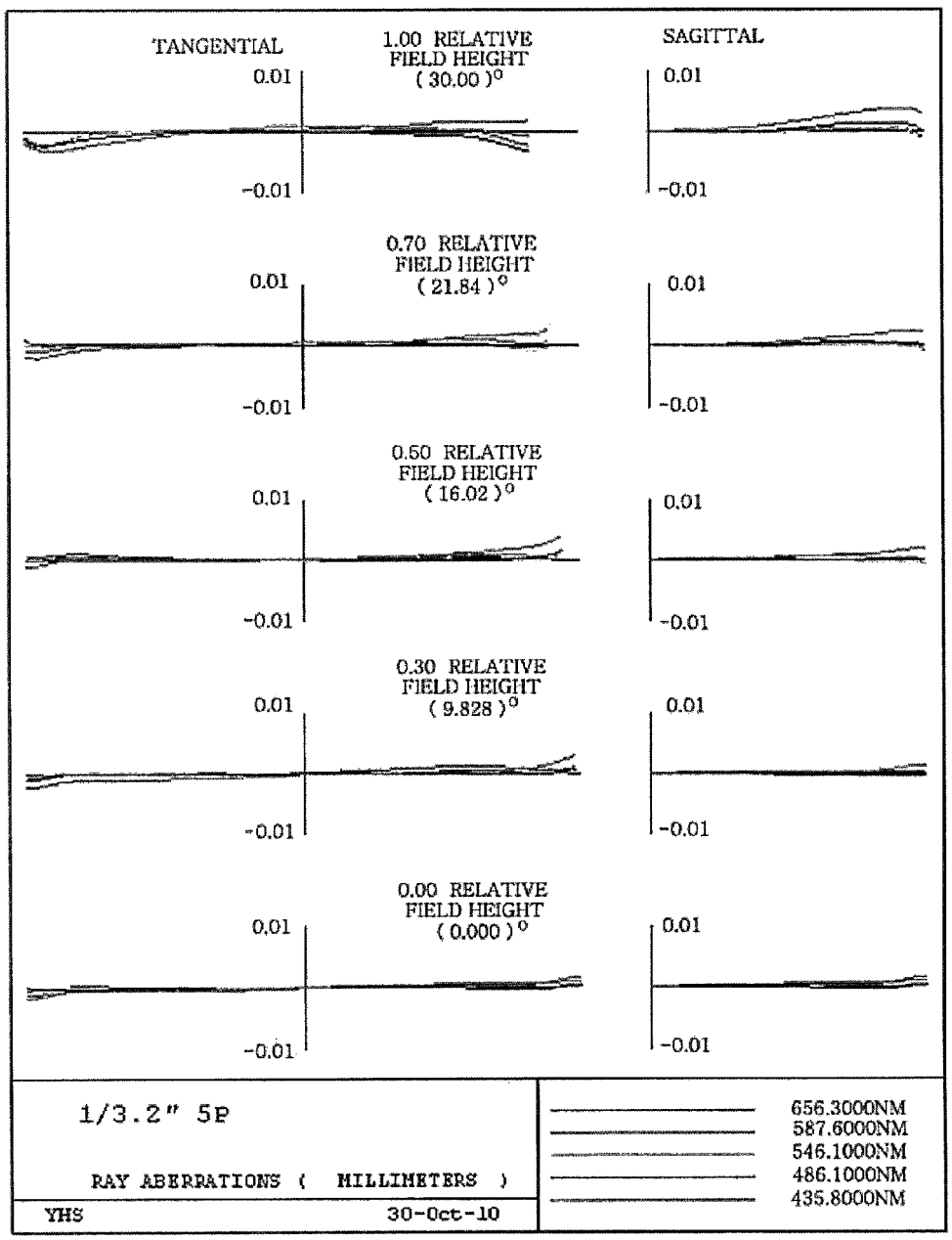
FIG. 6 is a graph showing coma aberration of the imaging lens unit according to the second embodiment of the present invention.

FIG. 6 is a graph showing coma aberration of the imaging lens unit according to the second embodiment of the present invention. As illustrated in FIG. 6, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 6, experimental data values measured according to the second embodiment of the present invention are close to the X-axis in almost all areas.

Thus, the imaging lens unit according to the second embodiment of the present invention provides an excellent coma aberration correction function.

Third Embodiment

Figure 7:
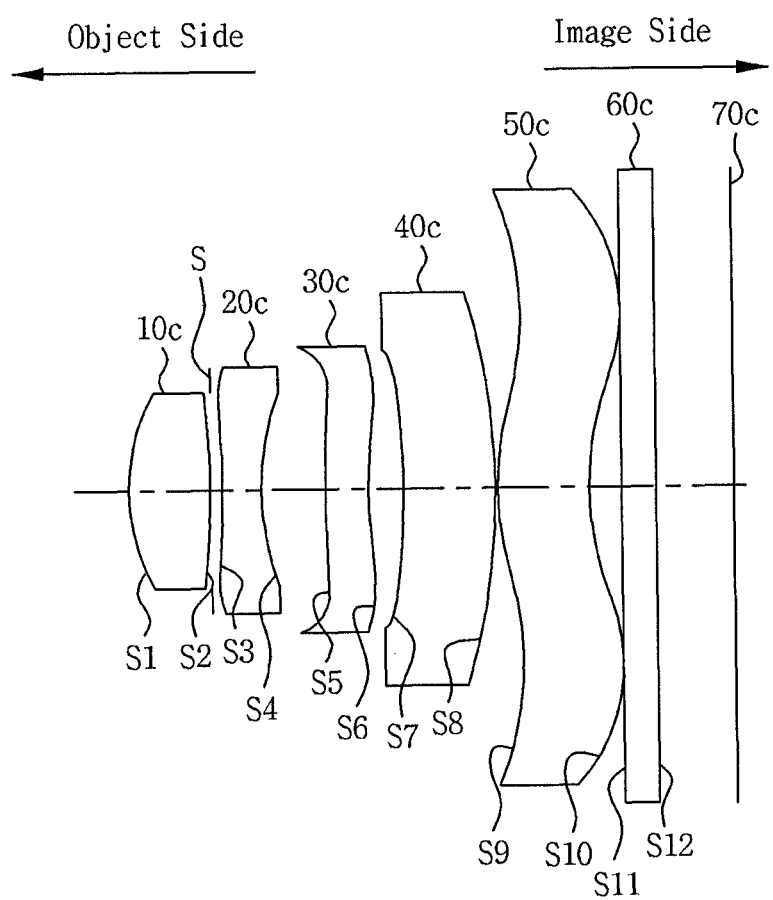
FIG. 7 is a cross-sectional view schematically illustrating an internal structure of an imaging lens unit according to a third embodiment of the present invention.

FIG. 7 is a cross-sectional view schematically illustrating an internal structure of an imaging lens unit according to a third embodiment of the present invention. Description of the same or corresponding elements to those of the previous embodiments will be denoted with the same reference numerals, and description of repeated elements will be omitted. In regard to this, the imaging lens unit according to the third embodiment of the present invention will be described hereinafter.

As illustrated in FIG. 7, the imaging lens unit according to the third embodiment of the present invention includes, in order from an object side of an object which is to be formed as an image, a first lens 10c, a second lens 20c, a third lens 30c, a fourth lens 40c, a fifth lens 50c, a filter 60, and an image sensor 70.

In detail, the first lens 10c has positive (+) power, and the second lens 20c has negative (−) power, third lens 30c has negative (−) power, the fourth lens 40c has negative (−) power, and the fifth lens 50c has negative (−) power.

Also, an aperture stop S that adjusts a light amount of incident light incident from an object to be formed as an image and a focal depth may be disposed between the first lens 10c and the second lens 20c.

Also, the filter 60 and the image sensor 70 are arranged at the back of the fifth lens 50c.

Table 7 below shows design data of the lenses of the imaging lens unit according to the third embodiment of the present invention.

TABLE 7

| Lens number | Lens surface number | Curvature radius (mm) | Thickness (mm) | Index | Abbe number |
|---|---|---|---|---|---|
| First lens | S1 | 1.730 | 0.752 | 1.534 | 56.200 |
|  | S2 | −8.569 | 0.050 |  |  |
| Aperture stop | S3 | INFINITY | 0.061 |  |  |
| Second lens | S4 | −13.180 | 0.400 | 1.614 | 25.600 |
|  | S5 | 3.528 | 0.620 |  |  |
| Third lens | S6 | 5.570 | 0.400 | 1.534 | 56.200 |
|  | S7 | 4.920 | 0.307 |  |  |
| Fourth lens | S8 | −4.191 | 0.900 | 1.614 | 25.600 |
|  | S9 | −5.275 | 0.050 |  |  |
| Fifth lens | S10 | 2.036 | 0.855 | 1.534 | 56.200 |
|  | S11 | 1.702 | 0.300 |  |  |
| Filter | S12 |  | 0.300 | 1.517 | 64.197 |
|  | S13 |  | 0.700 |  |  |

Table 8 below shows aspheric constants of the lenses of the imaging lens unit according to the third embodiment of the present invention.

Table 9 below shows focal lengths (Focal Length Tolerance, EFL) of the lenses of the imaging lens unit according to the third embodiment of the present invention and according to the above conditional expressions.

TABLE 9

| Lens number | Focal length |
|---|---|
| First lens | 2.766 |
| Second lens | −4.492 |
| Third lens | −100.348 |
| Fourth lens | −48.560 |
| Fifth lens | −180.664 |
| Ass'y | 4.9446 |

Figure 8:
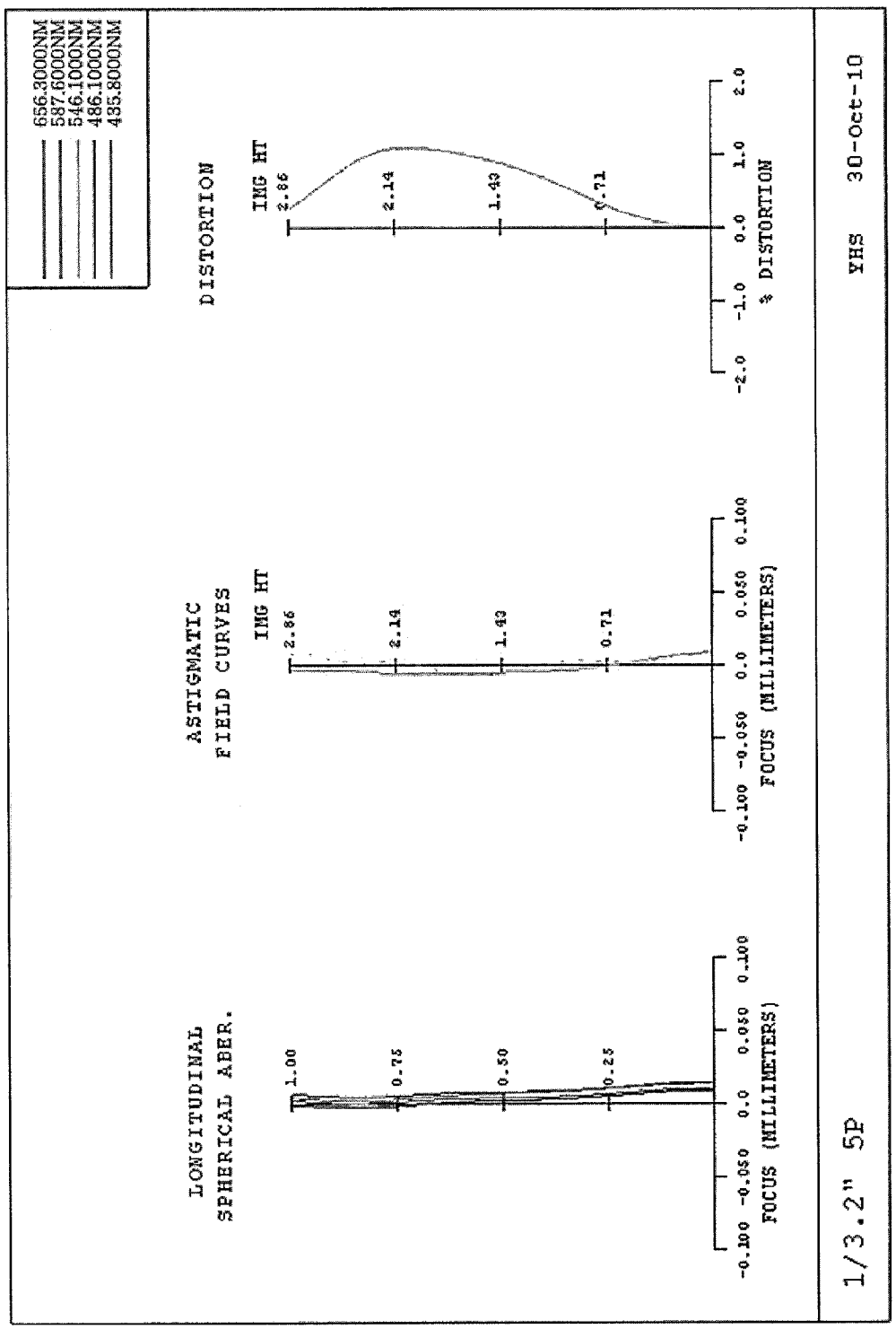
FIG. 8 is a graph showing aberrations of the imaging lens unit according to the third embodiment of the present invention.

FIG. 8 is a graph showing aberrations of the imaging lens unit according to the third embodiment of the present invention. As illustrated in FIG. 8, the graph shows longitudinal spherical aberration, astigmatic field curves, and distortion.

A Y-axis of the graph of FIG. 8 denotes an image height, and an X-axis denotes a focal length (unit: mm) and distortion (unit: %).

Also, with regard to interpretation of the graph of FIG. 8, it may be interpreted that the closer the curves of the graph are to the Y-axis, the better is an aberration correction function. Referring to the graph of FIG. 8, experimental data values measured according to the third embodiment of the present invention are close to the Y-axis in almost all areas.

Accordingly, the imaging lens unit according to the third embodiment of the present invention has excellent characteristics regarding spherical aberration, astigmatism, and distortion.

Figure 9:
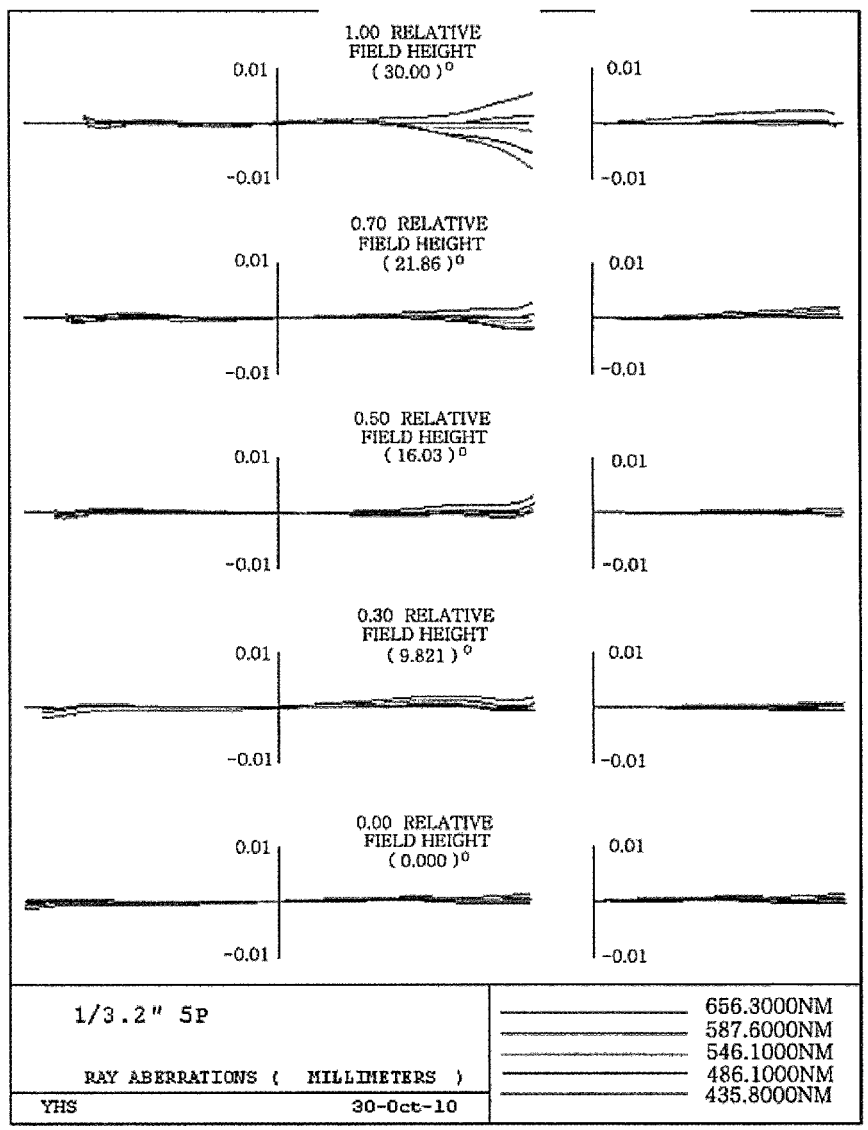
FIG. 9 is a graph showing coma aberration of the imaging lens unit according to the third embodiment of the present invention.

FIG. 9 is a graph showing coma aberration of the imaging lens unit according to the third embodiment of the present invention. As illustrated in FIG. 9, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 9, experimental data values measured according to the third embodiment of the present invention are close to the X-axis in almost all areas.

Thus, the imaging lens unit according to the third embodiment of the present invention provides an excellent coma aberration correction function.

Fourth Embodiment

Figure 10:
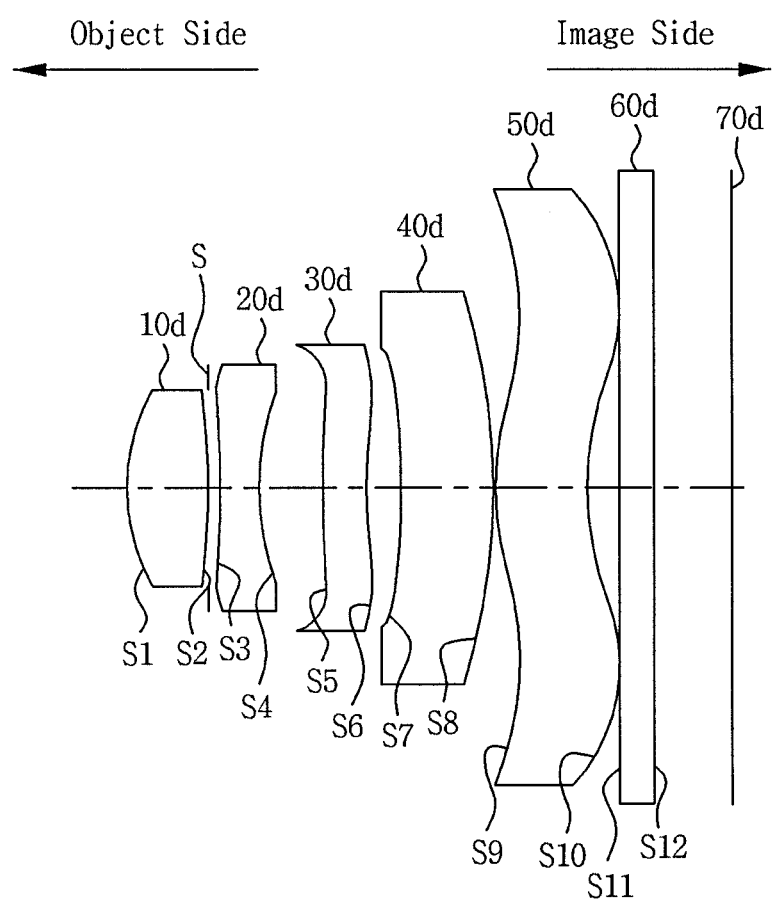
FIG. 10 is a cross-sectional view schematically illustrating an internal structure of an imaging lens unit according to a fourth embodiment of the present invention.

FIG. 10 is a cross-sectional view schematically illustrating an internal structure of an imaging lens unit according to a

TABLE 8

| Lens number | Lens surface number | K | A | B | C | D | E | F |
|---|---|---|---|---|---|---|---|---|
| First lens | S1 | −9.4427E−01 | 1.5322E−02 | −8.2026E−03 | 9.9253E−03 | −1.7307E−02 |  |  |
|  | S2 | 5.7561E+00 | 2.3480E−03 | 7.0525E−03 | −4.8277E−02 | 1.8181E−02 |  |  |
| Aperture stop | S3 |  |  |  |  |  |  |  |
| Second lens | S4 | 0.0000E+00 | 2.5677E−02 | 3.7071E−02 | −6.9411E−02 | 4.4068E−02 |  |  |
|  | S5 | 8.7002E+00 | −6.2934E−04 | 4.2185E−02 | 4.2185E−02 | 3.0125E−02 |  |  |
| Third lens | S6 | 0.0000E+00 | −8.9747E−02 | −3.8532E−02 | 5.7459E−02 | −3.3302E−02 |  |  |
|  | S7 | 0.0000E+00 | −1.1576E−02 | −1.0527E−01 | 7.4150E−02 | −1.9678E−02 |  |  |
| Fourth lens | S8 | −7.0912E+01 | 4.3019E−02 | −3.8067E−02 | −4.4898E−02 | 4.3045E−02 | −1.0699E−02 |  |
|  | S9 | −2.0574E+01 | 3.9125E−02 | −3.4167E−02 | 8.2237E−03 | −6.7424E−04 | −8.5788E−06 |  |
| Fifth lens | S10 | −4.0068E+00 | −7.0899E−02 | 2.0161E−02 | −4.0410E−03 | 4.8831E−04 | −2.4990E−05 |  |
|  | S11 | −4.8559E+00 | −4.3280E−02 | 9.4989E−03 | −1.5821E−03 | 1.2507E−04 | −4.0178E−06 |  | fourth embodiment of the present invention. Description of the same or corresponding elements to those of the previous embodiment will be denoted with the same reference numerals, and description of repeated elements will be omitted. In regard to this, the imaging lens unit according to the fourth embodiment of the present invention will be described hereinafter.

As illustrated in FIG. 10, the imaging lens unit according to the fourth embodiment of the present invention includes, in order from an object side of an object which is to be formed as an image, a first lens 10d, a second lens 20d, a third lens 30d, a fourth lens 40d, a fifth lens 50d, a filter 60, and an image sensor 70.

In detail, the first lens 10d has positive (+) power, and the second lens 20d has negative (−) power, third lens 30d has positive (+) power, the fourth lens 40d has negative (−) power, and the fifth lens 50d has negative (−) power.

Also, an aperture stop S that adjusts a light amount of incident light incident from an object to be formed as an image and a focal depth may be disposed between the first lens 10d and the second lens 20d.

Also, the filter 60 and the image sensor 70 are arranged at the back of the fifth lens 50d.

Table 10 below shows design data of the lenses of the imaging lens unit according to the fourth embodiment of the present invention.

TABLE 10

| Lens number | Lens surface number | Curvature radius (mm) | Thickness (mm) | Index | Abbe number |
|---|---|---|---|---|---|
| First lens | S1 | 1.649 | 0.692 | 1.534 | 56.200 |
|  | S2 | −17.857 | 0.050 |  |  |
| Aperture stop | S3 | INFINITY | 0.060 |  |  |
| Second lens | S4 | −33.464 | 0.400 | 1.614 | 25.600 |
|  | S5 | 3.069 | 0.660 |  |  |
| Third lens | S6 | 5.521 | 0.435 | 1.534 | 56.200 |
|  | S7 | 7.247 | 0.324 |  |  |
| Fourth lens | S8 | −2.864 | 0.838 | 1.614 | 25.600 |
|  | S9 | −3.554 | 0.050 |  |  |
| Fifth lens | S10 | 2.093 | 0.891 | 1.534 | 56.200 |
|  | S11 | 1.634 | 0.300 |  |  |
| Filter | S12 |  | 0.300 | 1.517 | 64.197 |
|  | S13 |  | 0.700 |  |  |

Table 11 below shows aspheric constants of the lenses of the imaging lens unit according to the fourth embodiment of the present invention.

TABLE 11

| Lens number | Lens surface number | K | A | B | C | D | E | F |
|---|---|---|---|---|---|---|---|---|
| First lens | S1 | −7.3137E−01 | 2.1043E−02 | −2.1087E−03 | 1.4879E−02 | −1.3640E−02 |  |  |
|  | S2 | 6.3414E+01 | −9.2536E−03 | 4.0018E−02 | −5.2746E−02 | 1.1953E−02 |  |  |
| Aperture stop | S3 |  |  |  |  |  |  |  |
| Second lens | S4 | 0.0000E+00 | −2.5029E−02 | 8.3666E−02 | −9.5937E−02 | 4.0994E−02 |  |  |
|  | S5 | 6.3117E−00 | −3.3108E−02 | 6.4702E−02 | −6.4244E−02 | 3.3962E−02 |  |  |
| Third lens | S6 | 0.0000E+00 | −6.7692E−02 | 6.4702E−02 | 5.5436E−02 | −2.7922E−02 |  |  |
|  | S7 | 0.0000E+00 | 2.9193E−02 | −1.2470E−01 | 7.7632E−02 | −1.8549E−02 |  |  |
| Fourth lens | S8 | −3.3044E+01 | 5.9958E−02 | −4.7098E−02 | −3.3764E−02 | 3.5789E−02 | −8.7537E−03 |  |
|  | S9 | −2.4258E+01 | 4.0732E−02 | −3.4555E−02 | 8.3201E−03 | −6.6003E−04 | −1.1978E−05 |  |
| Fifth lens | S10 | −4.4930E+00 | −6.1268E−02 | 1.7272E−02 | −3.9021E−03 | 5.2804E−04 | −2.8354E−05 |  |
|  | S11 | −6.2953E+00 | −3.0681E−02 | 5.4197E−03 | −9.2536E−04 | 5.8930E−05 | −8.3315E−07 |  |

Below, Table 12 shows focal lengths (Focal Length Tolerance, EFL) of the lenses of the imaging lens unit according to the fourth embodiment of the present invention and according to the above conditional expressions.

TABLE 12

| Lens number | Focal length |
|---|---|
| First lens | 2.863 |
| Second lens | −4.560 |
| Third lens | 39.909 |
| Fourth lens | −44.664 |
| Fifth lens | −43.002 |
| Ass'y | 4.9475 |

Figure 11:
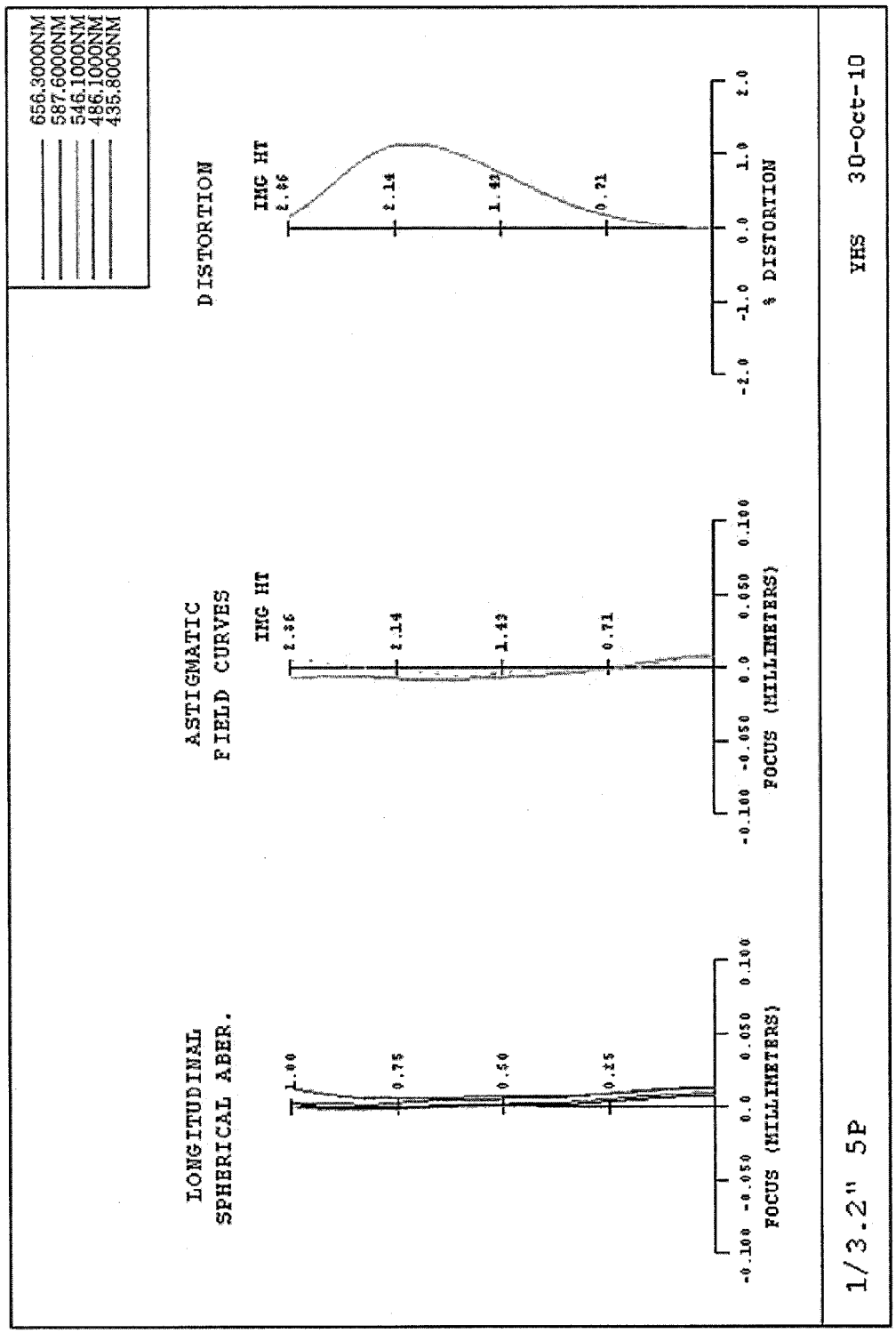
FIG. 11 is a graph showing aberrations of the imaging lens unit according to the fourth embodiment of the present invention.

FIG. 11 is a graph showing aberrations of the imaging lens unit according to the fourth embodiment of the present invention. As illustrated in FIG. 11, the graph shows longitudinal spherical aberration, astigmatic field curves, and distortion.

A Y-axis of the graph of FIG. 11 denotes an image height, and an X-axis denotes a focal length (unit: mm) and distortion (unit: %).

Also, with regard to interpretation of the graph of FIG. 11, it may be interpreted that the closer the curves of the graph are to the Y-axis, the better is an aberration correction function. Referring to the graph of FIG. 11, experimental data values measured according to the fourth embodiment of the present invention are close to the Y-axis in almost all areas.

Accordingly, the imaging lens unit according to the fourth embodiment of the present invention has excellent characteristics regarding spherical aberration, astigmatism, and distortion.

Figure 12:
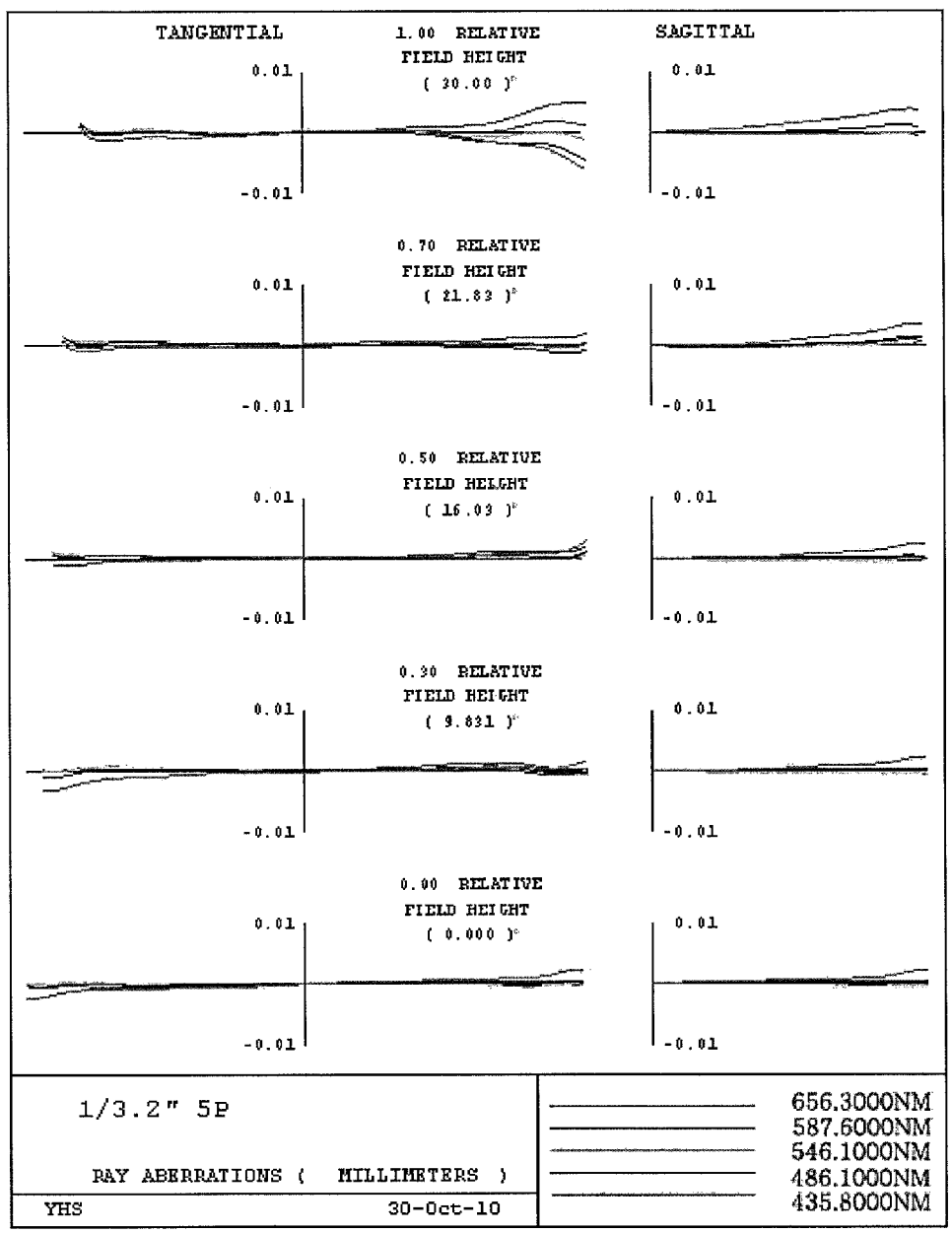
FIG. 12 is a graph showing coma aberration of the imaging lens unit according to the fourth embodiment of the present invention.

FIG. 12 is a graph showing coma aberration of the imaging lens unit according to the fourth embodiment of the present invention. As illustrated in FIG. 12, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 12, experimental data values measured according to the fourth embodiment of the present invention are close to the X-axis in almost all areas.

Thus, the imaging lens unit according to the fourth embodiment of the present invention provides an excellent coma aberration correction function.

According to the preferred embodiments of the present invention, as the imaging lens unit including five lenses is provided, a compact optical system that is suitable for portable terminals, a compact camera module, and a high resolving power may be provided.

Although the embodiment of the present invention has been disclosed for illustrative purposes, it will be appreciated that the imaging lens unit according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An image lens unit, comprising:
    a first lens having positive (+) power and comprising a convex surface on an object side;
    a second lens having negative (−) power and comprising a concave surface on an image side;
    a third lens having positive (+) power and being convex in the center toward the image side;
    a fourth lens being concave in the center toward the object side and convex in the center toward the image side;
    a fifth lens having negative (−) power and comprising:
        an object side surface being convex in the center and concave at the periphery; and
        an image side surface being concave in the center and convex at the periphery; and
    an aperture stop disposed between the first lens and the second lens to adjust a light amount,
    wherein an Abbe number v1 of the first lens, an Abbe number v2 of the second lens and an Abbe number v4 of the fourth lens satisfy the following conditional expression:

$$50 < v1$$

$$0 < v2 < 30$$

$$0 < v4 < 30,$$

and
    wherein the first lens, the second lens, the third lens, the fourth lens and the fifth lens are arranged in order from the object side to the image side.

2. The image lens unit of claim 1, wherein the convex surface of the first lens and the concave surface of the second lens are arranged on an optical axis.

3. The image lens unit of claim 2, wherein:
    Abbe numbers of the first and third lenses are the same, and refractive indexes of the first and third lenses are the same, and
    Abbe numbers of the second and fourth lenses are the same, and refractive indexes of the second and fourth lenses are the same.

4. The image lens unit of claim 2, wherein an Abbe number v1 of the first lens and an Abbe number v3 of the third lens are about 56.2.

5. The image lens unit of claim 2, wherein an Abbe number v2 of the second lens and an Abbe number v3 of the third lens satisfy the following conditional expression:

$$|v2-v3|>30.$$

6. The image lens unit of claim 2, wherein:
    the first lens, the second lens, the third lens, and the fourth lens are made of a plastic material, and
    the second and fourth lenses are made of a high dispersion material.

7. The image lens unit of claim 2, wherein the image lens unit satisfies the following conditional expression:

$$0.080 < \frac{ct3}{f} < 0.112$$

where ct3 is a thickness of the third lens, and f is the overall focal distance of the image lens unit.

8. The image lens unit of claim 2, wherein the image lens unit satisfies the following conditional expression:

$$0.054 < \frac{d34}{f} < 0.066$$

where d34 is a distance from an image-side surface of the third lens to an object-side surface of the fourth lens, and f is the overall focal distance of the image lens unit.

9. The image lens unit of claim 2, wherein the image lens unit satisfies the following conditional expression:

$$1.121 < \left|\frac{r2}{f}\right| < 3.610$$

wherein a radius r2 of curvature of an image-side surface of the first lens, and f is the overall focal distance of the image lens unit.

10. The image lens unit of claim 2, wherein the image lens unit satisfies the following conditional expression:

$$0.092 < \left|\frac{r1}{r2}\right| < 0.328$$

where r1 is a radius of curvature of an object-side surface of the first lens, and r2 is a radius of curvature of an image-side surface of the first lens.

11. The imaging lens unit of claim 2, wherein:
    an Abbe number v1 of the first lens, an Abbe number v2 of the second lens, an Abbe number v3 of the third lens, and an Abbe number v4 of the fourth lens satisfy the following conditional expression:

$$0.7 < (v1+v2)/(v3+v4) \leq 1.0.$$

a total focal length f of the imaging lens unit, and a distance tt on an optical axis from an object-side surface of the first lens to an imaging sensor satisfy the following conditional expression:

$$0 < tt/f < 1.3.$$

12. An image lens unit, comprising:
a first lens having positive (+) power and a biconvex shape;
a second lens having negative (−) power and comprising a concave surface on an image side;
a third lens having positive (+) power and comprising a convex surface on the image side;
a fourth lens being concave in the center toward an object side and convex in the center toward the image side;
a fifth lens having negative (−) power and comprising:
an object side surface being convex in the center and concave at the periphery; and
an image side surface being concave in the center and convex at the periphery; and
an aperture stop disposed in front of the first lens to adjust a light amount,
wherein an Abbe number v1 of the first lens and an Abbe number v2 of the second lens satisfy the following conditional expression:

50<v1

0<v2<30, and
wherein the first lens, the second lens, the third lens, the fourth lens and the fifth lens are arranged in order from the object side to the image side.

13. The image lens unit of claim 12, wherein the biconvex shape of the first lens, the concave surface of the second lens and the convex surface of the third lens are arranged on an optical axis.

14. The image lens unit of claim 13, wherein a focal distance f1 of the first lens satisfies the following conditional expression:

2.629 mm≤f1<2.863 mm.

15. The image lens unit of claim 13, wherein the image lens unit satisfies the following conditional expression:

$$-3.609 < \frac{r2}{f} < -1.122$$

where r2 is a radius of curvature of an image-side surface of the first lens, and f is the overall focal distance of the image lens unit.

16. The image lens unit of claim 13, wherein the image lens unit satisfies the following conditional expression:

$$0.080 < \frac{ct3}{f} < 1.112$$

where ct3 is a thickness of the third lens, and f is the overall focal distance of the image lens unit.

17. The image lens unit of claim 13, wherein the image lens unit satisfies the following conditional expression:

$$-0.831 < \frac{r1+r2}{r1-r2} < -0.506$$

where r1 is a radius of curvature of an object-side surface of the first lens, and r2 is a radius of curvature of an image-side surface of the first lens.

18. The image lens unit of claim 13, wherein a distance d12 from an image-side surface of the first lens to an object-side surface of the second lens satisfies the following conditional expression:

0.054 mm≤d12≤0.111 mm.

19. The image lens unit of claim 13, wherein the image lens unit satisfies the following conditional expression:

$$0.010 < \frac{d12}{f} < 0.023$$

$$0.010 < \frac{d45}{f} < 0.031$$

where d12 is a distance from an image-side surface of the first lens to an object-side surface of the second lens, d45 is a distance from an image-side surface of the fourth lens to an object-side surface of the fifth lens, and f is the overall focal distance of the image lens unit.

20. The image lens unit of claim 13, wherein the image lens unit satisfies the following conditional expression:

$$0.020 < \frac{d12}{f1} < 0.041$$

$$-0.145 < \frac{d23}{f2} < -0.066$$

where d12 is a distance from an image-side surface of the first lens to an object-side surface of the second lens, d23 is a distance from an image-side surface of the second lens to an object-side surface of the third lens, f1 is a focal distance of the first lens, and f2 is a focal distance of the second lens.

21. The lens module of claim 13, wherein a thickness ct3 of the third lens satisfies the following conditional expression:

0.4 mm≤ct3≤0.551 mm.

22. The image lens unit of claim 13, wherein a radius r1 of curvature of an object-side surface of the first lens, a radius r2 of curvature of an image-side surface of the first lens, and a radius r10 of curvature of an image-side surface of the fifth lens satisfy the following conditional expression:

1.649 mm≤r1≤1.816 mm

−17.857 mm≤r2≤−5.547 mm 1.634 mm≤r10≤1.784 mm.

23. The image lens unit of claim 22, wherein a radius r3 of curvature of an object-side surface of the second lens satisfies the following conditional expression:

9.198 mm≤|r3|≤97.166 mm.

24. The image lens unit of claim 13, wherein the image lens unit satisfies the following conditional expression:

$$1.859 < \left|\frac{r3}{f}\right| < 19.638$$

where r3 is a radius of curvature of an object-side surface of the third lens, and f is the overall focal distance of the image lens unit.

25. The lens module of claim 13, wherein the lens module satisfies the following conditional expression:

$$0.092 < \left|\frac{r1}{r2}\right| < 0.328$$

$$2.209 < \left|\frac{r3}{r4}\right| < 34.022$$

where r1 is a radius of curvature of an object-side surface of the first lens, and r2 is a radius of curvature of an image-side surface of the first lens, r3 is a radius of curvature of an object-side surface of the second lens, and r4 is a radius of curvature of an image-side surface of the second lens.

26. The imaging lens unit of claim 13, wherein:

an Abbe number v1 of the first lens, an Abbe number v2 of the second lens, an Abbe number v3 of the third lens, and an Abbe number v4 of the fourth lens satisfy the following conditional expression:

$$0.7 < (v1+v2)/(v3+v4) \leq 1.0,$$

and a total focal length f of the imaging lens unit and a distance tt on an optical axis from an object-side surface of the first lens to an imaging sensor satisfy the following conditional expression:

$$0 < tt/f < 1.3.$$

27. The image lens unit of claim 13, wherein an Abbe number of the first lens, an Abbe number of the third lens and an Abbe number of the fifth lens are about 56.2.

28. The image lens unit of claim 13, wherein:
the first lens, the second lens, the third lens, and the fourth lens are made of a plastic material,
the second lens is made of a high dispersion material, and
Abbe numbers of the first, third and fifth lenses are the same, and refractive indexes of the first, third and fifth lenses are the same.

29. The imaging lens unit of claim 13, wherein a radius of curvature of an object-side surface of the first lens is about 1.8 mm, and a radius of curvature of an image-side surface of the fifth lens is about 1.66 mm.

30. The image lens unit of claim 13, wherein an Abbe number v2 of the second lens and an Abbe number v3 of the third lens satisfy the following conditional expression:

$$|v2-v3| > 30.$$

* * * * *